United States Patent [19]

Hammerschlag

[11] 4,341,486
[45] Jul. 27, 1982

[54] LOCKING TAB FOR HOOK-IN TYPE SHELVING

[76] Inventor: Peter G. Hammerschlag, 220 - 111th Ave. SE., Bellevue, Wash. 98004

[21] Appl. No.: 41,385

[22] Filed: May 22, 1979

Related U.S. Application Data

[63] Continuation of Ser. No. 815,843, Jul. 14, 1977, Pat. No. 4,157,228.

[51] Int. Cl.³ .............................................. F16B 7/22
[52] U.S. Cl. .................................. 403/252; 403/316; 211/192
[58] Field of Search ............... 403/252, 254, 263, 353, 403/316, 319, 315, 330; 211/190, 191, 192, 187; 248/243, 221.2

[56] References Cited

U.S. PATENT DOCUMENTS

| | | | |
|---|---|---|---|
| 977,609 | 12/1910 | Freeman | 248/243 |
| 2,261,956 | 11/1941 | Brownlie et al. | 248/243 |
| 3,263,821 | 8/1966 | Klene et al. | 211/190 |
| 3,315,996 | 4/1967 | Sedo | 403/252 |
| 3,601,432 | 8/1971 | Fenwick | 403/252 X |
| 3,862,691 | 1/1975 | Mori et al. | 108/156 X |
| 4,063,835 | 12/1977 | Husband | 403/316 X |
| 4,157,228 | 6/1979 | Hammerschlag | 403/316 X |

*Primary Examiner*—Andrew V. Kundrat

[57] ABSTRACT

An improved locking tab for horizontal components of hook-in type shelving, of the kind that is integral with the horizontal components and bent into the upper part of one of the slots of the posts, this locking tab having:
(1) an upper surface that is slanted backwards a certain amount so that this surface is perpendicular with the centerline of the post or slightly slanted backwards when the locking tab is bent into the locked position, thus preventing that the locking tab is bent back by shaking of the shelving.
(2) a secondary tab with a shoulder surface abutting the post when the tab is bent into the locked position, and a surface away from the post such that the end of a screwdriver can be placed between the latter surface and the post and twisted to bend the locking tab back into its original position, thus making it easy to disassemble the shelving.

2 Claims, 4 Drawing Figures

LOCKING TAB FOR HOOK-IN TYPE SHELVING

This is a continuation of application Ser. No. 815,843, filed July 14, 1977 and now U.S. Pat. No. 4,157,228.

BACKGROUND OF THE INVENTION

This invention relates to shelving systems consisting of vertical posts with slots and horizontal components with hooks going into these slots as shown in U.S. Pat. No. 4,063,835 by Husband, et al. Existing locking tabs integral with horizontal components as shown in Husband, et al and bent into post slots above the hooks of the horizontal components to prevent the latter from coming out of the post slots due to unusual or accidental side loads from earthquakes, collisions of forklifts against shelving etc., are unsatisfactory in two areas:

(1) It is very difficult and cumbersome to bend them back into their original position if the shelving has to be taken apart.

(2) When the shelving is exposed to substantial shaking, they have a tendency to work loose. This is caused by the fact that the surface on the tab that locks against the top of the slot in the post is slanted forward after the tab is bent into its locking position. This combined with the upward movement of the hook and the sideways shifting when sideloads occur, will bend the locking tab back in small increments, but sufficiently fast to cause the horizontal components to come out after a few minutes of vigorous shaking.

To remedy these deficiencies it is possible to design more sophisticated locking devices, not integral with the horizontal shelving components, but these will increase erection time of the shelving and also make it more expensive.

SUMMARY OF THE INVENTION

In view of the foregoing it is the object of the present invention to provide a locking tab, integral with horizontal components of the shelving, that can be easily bent back in its original position and that after being bent into its locking position has an upper surface that is perpendicular to the centerline of the post or slightly slanted backwards. Briefly this is accomplished by:

(1) Adding a secondary locking tab to the primary locking tab which allows to bend the whole tab back into its original position by inserting a screwdriver between the secondary tab and the post and twisting it.

(2) Slanting the top surface of the primary tab backwards at an angle equal to or larger than the angle the tab is rotated forward when bent into the locking position, so that in the latter position the top surface of the primary tab is perpendicular to the centerline of the post or slightly slanted backwards.

The foregoing and other objects, features and advantages of the present invention will be apparent from the following detailed description of a preferred embodiment of the invention, as illustrated in the accompanying drawings.

DESCRIPTION OF THE PREFERRED EMBODIMENT

Figure 1:
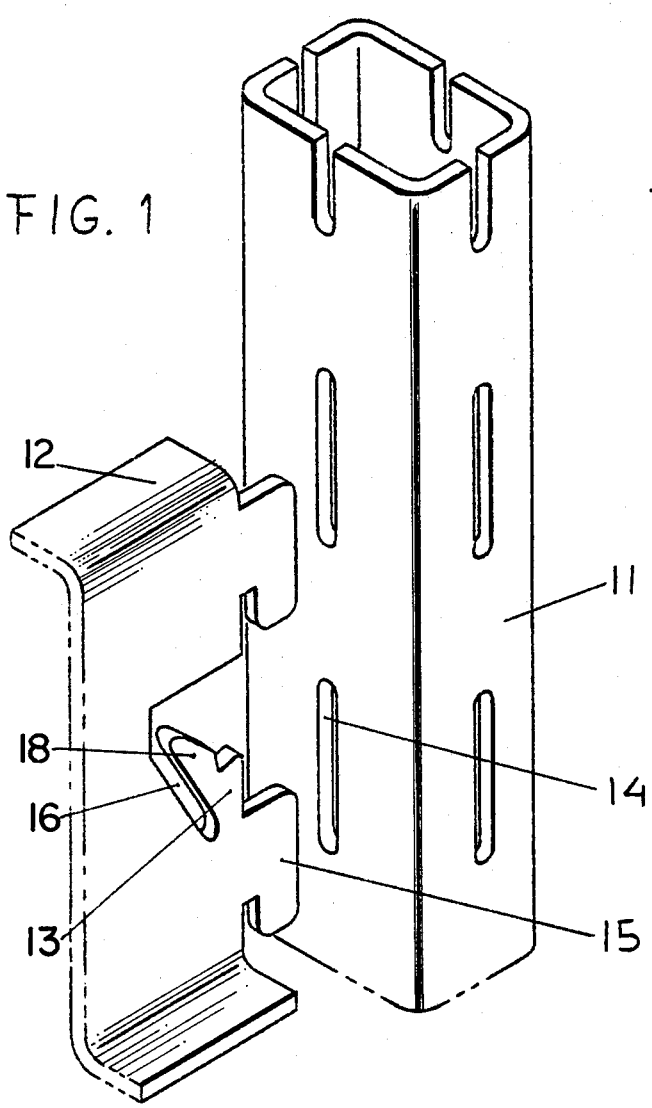
FIG. 1 is an isometric view of a section of a post and the end of a horizontal component in position to be hooked into the post, the horizontal component having a locking tab per this invention.
Figure 2:
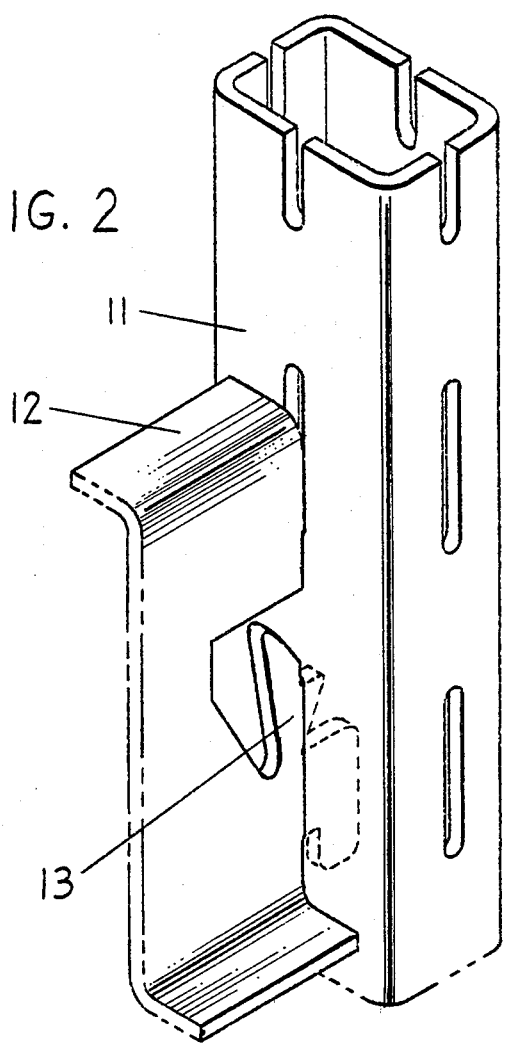
FIG. 2 is an isometric view of the same post and horizontal component, but with the horizontal component hooked into the post and the locking tab bent into the locking position.
Figure 3:
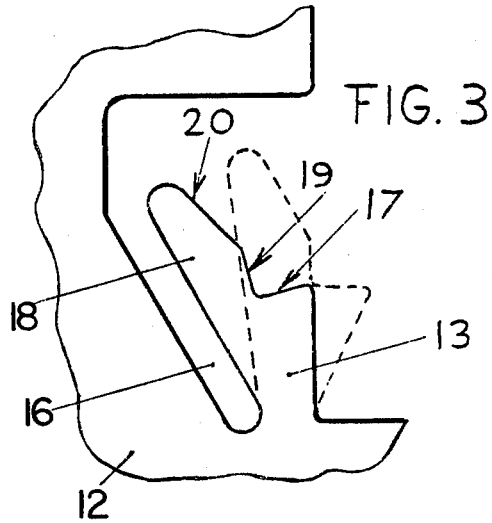
FIG. 3 shows enlarged the locking tab of FIGS. 1 and 2 in side view in its position before bending (solid lines) and after bending (dashed lines).
Figure 4:
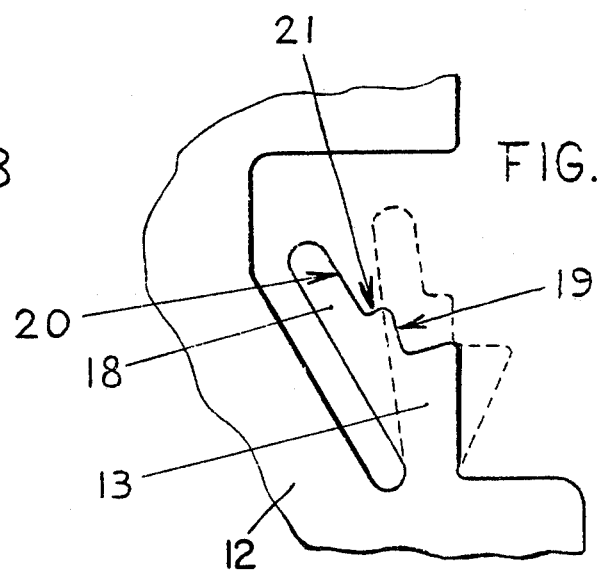
FIG. 4 shows a locking tab as in FIG. 3, but with a somewhat differently shaped secondary locking tab.

The preferred embodiment will now be described referring to FIGS. 1, 2 and 3. Shown are a post 11 and a horizontal component 12. The horizontal component 12 has a locking tab 13, that can be bent into the post slot 14 above the hook 15 of the horizontal member 12 by placing the end of a screwdriver in slot 16 and twisting it. The locking tab 13 has an upper surface 17 that is slanted back a certain amount so that this surface 17 is perpendicular with the centerline of the post or slightly slanted backwards when the locking tab 13 is bent into the post slot 14. (See dashed outline of locking tab in FIG. 3.) The locking tab 13 also has a secondary tab 18 which has a shoulder surface 19 that abuts against the post 11 when the tab 13 is bent into slot 14 and a surface 20 that tapers away from the post 11, so that the end of a screwdriver can be placed between this surface 20 and the post 11 and twisted to bend the tab 13 back into its original position. In FIG. 4 is shown another configuration of the secondary tab 18. It is different from the one shown in FIG. 3 in that there is a step 21 between surfaces 19 and 20 which allows deeper insertion of the end of the screwdriver between the secondary tab and the post and thereby will allow insertion of a larger screwdriver, making it slightly easier to bend the locking tab 13 back into its original position.

While the invention has been described and illustrated herein with reference to the preferred embodiment thereof, it will be understood by those skilled in the art that various changes in form and details may be made therein without departing from the spirit and scope of the invention.

What is claimed is:

1. A shelving assembly comprising vertical posts of sheet metal or the like having at least one wall with a plurality of slots in said wall spaced from each other along the length of the post; horizontal beams of sheet metal or the like having a web portion and one or more hooks protruding from the ends of the webs, each of these hooks being received in one of the slots in the posts such that said beams extend transversely from said posts with said webs substantially perpendicular to the said walls with slots of the posts; said beam webs having in addition, extending upwards from at least one of the hooks at each end of the beams, locking tabs, these locking tabs being bendable forward into slots of the posts above the hooks, thus preventing the beams from being lifted upward relative to the posts and thus preventing unlocking of the hooks of the beams from the posts, these locking tabs having in addition a secondary tab with a shoulder surface abutting the post when the tab is bent forward into the locked position and a second surface adjoining said abutting surface in an upward direction and tapering away from the post such that the end of a screwdriver can be placed between the said second surface and the post and twisted to bend the tab back into its original position.

2. A shelving assembly comprising vertical posts of sheet metal or the like having at least one wall with a plurality of slots in said wall spaced from each other along the length of the post; horizontal beams of sheet metal or the like having a web portion and one or more hooks protruding from the ends of the webs, each of these hooks being received in one of the slots in the posts such that said beams extend transversely from said posts with said webs substantially perpendicular to the said walls with slots of the posts; said beam webs having in addition, extending upwards from at least one of the hooks at each end of the beams, locking tabs, these locking tabs being bendable forward into slots of the posts above the hooks, thus preventing the beams from being lifted upward relative to the posts and thus preventing unlocking of the hooks of the beams from the posts, these locking tabs having in addition a secondary tab with a shoulder surface abutting the post when the tab is bent forward into the locked position, a second surface adjoining the latter abutting surface at substantially a right angle to said abutting surface and in a direction away from the post, and in addition a third surface adjoining the second surface at substantially a right angle in a direction upwards and substantially parallel to the post after the locking tab is bent into the locked position.

* * * * *